United States Patent
Barrier et al.

(10) Patent No.: US 6,214,396 B1
(45) Date of Patent: Apr. 10, 2001

(54) METHOD AND PLANT FOR EXTRACTING FISH OIL AND RESULTING PRODUCTS

(75) Inventors: Pascale Barrier, Tourlaville; Jean-Yves Rousseau, Equeurdreville, both of (FR)

(73) Assignee: Sea Oil, Cherbourg (FR)

( * ) Notice: Subject to any disclaimer, the term of this patent is extended or adjusted under 35 U.S.C. 154(b) by 0 days.

(21) Appl. No.: 09/319,995

(22) PCT Filed: Dec. 16, 1997

(86) PCT No.: PCT/FR97/02312

§ 371 Date: Aug. 4, 1999

§ 102(e) Date: Aug. 4, 1999

(87) PCT Pub. No.: WO98/26674

PCT Pub. Date: Jun. 25, 1998

(30) Foreign Application Priority Data

Dec. 17, 1996 (FR) .................................................. 96 15503

(51) Int. Cl.⁷ .............................. A23L 1/325; C11B 1/00; A23B 4/06
(52) U.S. Cl. .......................... 426/431; 426/437; 426/478; 426/479; 426/487
(58) Field of Search ..................................... 426/431, 437, 426/478, 479, 487

(56) References Cited

U.S. PATENT DOCUMENTS 3,759,716 * 9/1973 Schulman et al. .

FOREIGN PATENT DOCUMENTS

| 44 29 837 | 2/1996 | (DE) . |
| 0 301 795 | 2/1989 | (EP) . |
| 2 244 999 | 12/1991 | (GB) . |
| 46003972 | * 11/1971 | (JP) . |
| 59-14776 | 1/1984 | (JP) . |
| WO 87/00733 | 2/1987 | (WO) . |
| WO 91/03950 | 4/1991 | (WO) . |

* cited by examiner

Primary Examiner—Anthony J. Weier
(74) Attorney, Agent, or Firm—Seidel, Gonda, Lavorgna & Monaco, PC

(57) ABSTRACT

The invention concerns a method for extracting fish oil. The installation is characterised in that it has a flesh press (1) receiving the eviscerated headless fish forming a mixture in which the flesh press separates the flesh from the bones and the skin, a mixer (3) supplied with cold water (4) receiving the flesh, a decanter (6) receiving the flesh with water added from the mixer (3) for separating the loaded liquid phase from the flesh from which the oil has been extracted, a bagging machine (7) and means for deep-freezing the flesh (8) as well as a silo for storing the liquid phase (9) and an oil/sludge separator.

9 Claims, 1 Drawing Sheet

METHOD AND PLANT FOR EXTRACTING FISH OIL AND RESULTING PRODUCTS

The present invention relates to a process for extracting fish oil.

The invention relates also to an installation for implementing such a process and also to the resulting products.

Various processes are known for the manufacture of fish meal and fish oil. Those more or less complex processes, which treat various types of oil-yielding fish, such as sardines, anchovies, capelins and herrings or menhadens, depending on the countries concerned, generally consist in cooking the raw material (that is to say, the fish) and then in transferring the cooked product into a decanter in order to remove the water; the water is treated in order to recover oils, and the solid material is introduced into a press which separates the liquid and the solid materials. The solid materials are dried and constitute fish meal used, for example, in animal feed.

The recovered liquids follow various treatment routes in order to undergo separation of the sludges and the oils and also the waters to be discarded.

That treatment process has the disadvantage of recovering only the oil, the solid materials being products of very inferior quality which are suitable for animal feed only under certain conditions.

The object of the present invention is to provide a process and an installation for the manufacture of fish oil which enable the value of the products to be enhanced and permit the recovery not only of the oil, but also of the high-quality solid materials which can be used in human foodstuffs.

To that end, the invention relates to a process of the type defined above, characterised in that;

a) the fish is prepared by removing its head and viscera (it is also possible to use fish waste: filleting waste, fish heads), b) the fish is cooled to a low positive temperature and it is maintained at a temperature lower than 15° C. throughout all of the operations carried out subsequently, c) a flesh is formed which is cleaned by separating the bones and the skin, d) water is added to the cleaned flesh and the whole is mixed, e) the mixture is decanted into a liquid phase and a solid phase, f) the solid phase (flesh) is packaged and deep-frozen, g) the oil is separated from the liquid phase.

The process according to the invention uses cleaned fish, that is to say, fish from which the viscera and the head have been removed The flesh of the fish is transformed by remaining at a relatively low temperature of the order of a few degrees above zero.

The flesh is then treated in order to separate therefrom the oil and the de-oiled solid materials in which only a very small amount of oil (of the order of 3%) remains. The solid materials are very valuable in the farm-produce industry for cooked seafood dishes. The material is excellently preserved bacteriologically and constitutes a source of very valuable raw materials for the farm-produce industry owing to its low fat content.

According to other advantageous features of the process:

from 10% to 40% of water is added to the cleaned flesh, the flesh is packaged in bags which are deep-frozen, the liquid phase is stored in a cold silo, the liquid phase is separated into oil and sludge by at least one separating pass, optionally the liquid phase is subjected to two passes in order to separate the sludges and recover the oil which is conditioned by an inertia process and which is stored at low temperature.

The present invention relates also to an installation for implementing such a process, the installation being characterised in that it comprises a flesh press receiving the headless eviscerated fish or filleting waste or fish heads in order to form a mixture from which the flesh press separates the flesh, on the one hand, and the bones and the skin, on the other, a mixer which is provided with a cold water supply and which receives the flesh, a decanter receiving the flesh, to which water from the mixer has been added, in order to separate the charged liquid phase and the de-oiled flesh, a bagging machine and means for deep-freezing the flesh and also a silo for storing the liquid phase and an oil/sludge separator.

The invention relates also to the products obtained by implementing the process or the installation and, in particular, the de-oiled flesh which is intended for applications in farm-produce industries.

The present invention will be described hereinafter in more detail with reference to the single appended Figure explaining the process for extracting fish oil and de-oiled flesh.

Figure 1:
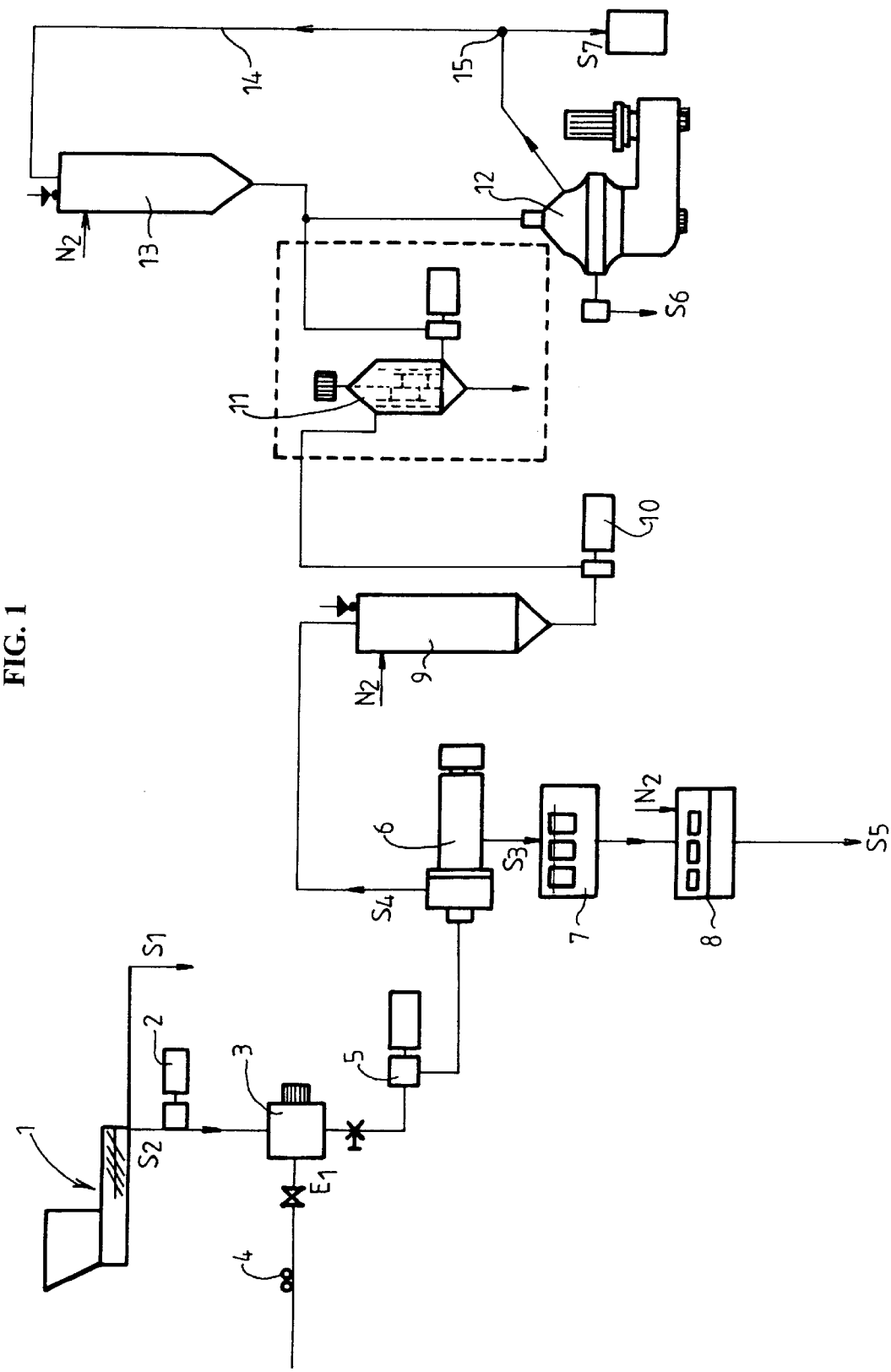
FIG. 1 shows the installation for treating fish to extract oil and obtain other products.

According to the Figure, the installation comprises a flesh press 1 receiving the eviscerated headless fish. The fish are supplied at a relatively low temperature of the order of a few degrees above zero.

The flesh press 1 is, for example, constituted by an endless screw and a sieve; it causes the flesh to be passed through the sieve while retaining the bones and skin, which are discharged from the flesh press by way of the outlet S1. The material involved is raw waste, which is optionally treated and dried for fertiliser.

The flesh supplied by the flesh press 1 to the outlet S2 is conveyed by means of a pump 2, for example a positive displacement vacuum pump having variable flow, to a mixer 3 which homogenises the flesh while adding to it cold water supplied by a metering pump 4 to its inlet 21. The percentage of cold water added depends on the viscosity of the flesh. The percentage is from 10% to 40%. The water is at a temperature lower than 15° C.

The mixture thus homogenized is fed by a positive displacement vacuum pump 5 to a decanter 6. The decanter separates the solid phase and the liquid phase.

The solid phase is constituted by the de-oiled flesh The de-oiled flesh is fed by way of the outlet S3 to a bagging machine 7 which packages the flesh in bags.

The flesh thus bagged passes into a deep-freeze device 8, for example, a plate-type deep-freeze, which deep-freezes the bags of flesh. The deep-freeze 8 is under inert atmosphere and, for that purpose, it receives liquid nitrogen providing the cold temperature and producing the inert atmosphere.

At the outlet S5, the bags of deep-frozen flesh are sent for storage. Storage is effected below zero.

Along the entire production line, between the flesh press 1 and the storage of the deep-frozen flesh, the flesh is maintained at a low temperature which is always lower than 15° C.

The liquid phase leaving the decanter 6 by way of the outlet S4 is a liquid phase charged with oil. The liquid is stored in a silo 9 under an inert atmosphere provided for by the introduction of gaseous nitrogen $N_2$.

The liquid stored in the silo 9 is removed therefrom by means of a positive displacement vacuum pump 10 which supplies the optionally charged liquid to a rotary brush sieve separator 11.

However, in general, the liquid phase coming from the silo 9 is charged directly into a separator 12 which removes the sludges by way of the outlet S6 in order to separate the oil therefrom (outlet S7).

At the outlet, the raw oil is stored in barrels at a temperature of the order of from 8 to 10° C. The water charged with sludges is treated in order to be discarded.

Depending on the particular case concerned, the oil may undergo several passes. Between two passes, it is recovered in a silo 13 arranged in a circuit 14 controlled by a valve 15 which provides either for the discharge of the oil or for its recycling.

If the clarification of the oil after a first pass in the separator is not adequate, the oil is recovered at the outlet of the separator 12 and fed into the silo 13 by way of the circuit 14. The oil is stored in the silo 13 under a nitrogen atmosphere in order to reduce the risk of oxidation. The oil is then sent from the silo 13 into the separator 12 again, which avoids the need for a second separator.

What is claimed is:

1. A process for extracting fish oil from fish comprising:
    a) preparing the fish by removing heads and viscera,
    b) cooling the fish to a low positive temperature and,
    c) forming a preparation of cleaned flesh by separating the bones and the skin of the cooled fish from the flesh,
    d) adding water to the cleaned flesh and mixing the water and flesh to form a mixture,
    e) decanting the mixture into a liquid phase and a flesh solid phase,
    f) packaging and freezing the flesh solid phase,
    g) separating the oil from the liquid phase
wherein the fish and flesh obtained therefrom is maintained at a temperature lower than about 15° C., beginning with cooling in step (b) and continuing through packaging and freezing in step (f).

2. A process according to claim 1, wherein 10% to 40% of water is added to the cleaned flesh.

3. A process according to claim 1, wherein the flesh is packaged in bags which are subjected to direct deep-freezing in a plate-type deep-freeze.

4. A process according to claim 1, wherein the liquid phase is stored in a cold silo.

5. A process according to claim 1, wherein the liquid phase is separated into oil and sludge by at least one separating pass.

6. A process according to claim 5, wherein the liquid phase is subjected to two separating passes in order to separate the sludges and recover the oil, and the recovered oil is conditioned by an inertia process and stored at low temperature.

7. An installation for implementing the process according to claim 1, comprising a flesh press adapted for receiving headless eviscerated fish and separating the fish flesh from the fish bones and skin, a mixer provided with a cold water supply for receiving the flesh and mixing the flesh with water from said water supply, a decanter for receiving the flesh-water mixture and separating the mixture into a liquid phase containing fish oil and a solid phase comprising the de-oiled flesh, a bagging machine for bagging the de-oiled flesh, means for deep-freezing the de-oiled flesh, a silo for storing the liquid phase containing fish oil and an oil/sludge separator, for removing sludges from the liquid phase.

8. An installation according to claim 7, wherein the oil/sludge separator is connected to the silo by means of a circuit adapted for receiving the oil from a first pass of the liquid phase in the separator and permitting a further pass of the oil in the separator before the oil is sent to an outlet for storage.

9. A frozen packaged fish flesh product lacking bones and skin and having an oil content of less than 3%, prepared from fish by the process comprising the following steps:
    a) preparing the fish by removing heads and viscera,
    b) cooling the fish to a low positive temperature,
    c) forming a preparation of cleaned flesh by separating the bones and the skin of the cooled fish from the flesh,
    d) adding water to the cleaned flesh and mixing the water and flesh to form a mixture,
    e) decanting the mixture into a liquid phase and a flesh solid phase, and
    f) packaging and freezing the flesh solid phase,
wherein the fish and flesh is maintained at a temperature lower than about 15° C., beginning with cooling in step (b) and continuing through packaging and freezing in step (f).

* * * * *